United States Patent
Snyder et al.

(10) Patent No.: US 7,218,929 B2
(45) Date of Patent: *May 15, 2007

(54) METHOD AND SYSTEM FOR IMPROVED MONITORING, MEASUREMENT AND ANALYSIS OF COMMUNICATION NETWORKS UTILIZING DYNAMICALLY AND REMOTELY CONFIGURABLE PROBES

(75) Inventors: Thomas M. Snyder, Botavia, IL (US); Jerry J. Liu, Sunnyvale, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/371,399

(22) Filed: Mar. 9, 2006

(65) Prior Publication Data

US 2006/0160535 A1    Jul. 20, 2006

Related U.S. Application Data

(63) Continuation of application No. 10/047,240, filed on Jan. 14, 2002, now Pat. No. 7,043,237.

(51) Int. Cl.
*H04Q 7/20* (2006.01)

(52) U.S. Cl. ............... 455/425; 455/423; 455/424; 455/418; 455/419; 455/420; 455/67.11; 455/67.14

(58) Field of Classification Search ............... 455/405, 455/423–425, 67.11, 14, 404.2, 414.1, 3, 455/418–420, 456.1–2, 13, 11.1
See application file for complete search history.

(56) References Cited

U.S. PATENT DOCUMENTS

| 6,088,588 | A * | 7/2000 | Osborne ............... 455/425 |
| 6,434,364 | B1 * | 8/2002 | O'Riordain ............ 455/67.11 |
| 7,043,237 | B2 * | 5/2006 | Snyder et al. ........... 455/425 |
| 2001/0049263 | A1 * | 12/2001 | Zhang ................ 455/67.1 |

* cited by examiner

*Primary Examiner*—Matthew Anderson
*Assistant Examiner*—Tuan Tran (57) ABSTRACT

In a method and system, one or more communication devices within a communication network are provided with a dynamically and remotely configurable probe element, implemented at least partially in software and controllable by the network operator via one or more communication links, capable of monitoring, measuring and capturing user interaction data flowing from voice and/or data transactions occurring in the network. User interaction data reflects a user's experience on the network and thus provides valuable raw data usable by the network operator for improving network quality from the user's perspective, especially when received from a statistically significant number of network user devices. Collected user interaction data can include network engineering metric data and/or user profile data.

17 Claims, 4 Drawing Sheets

Figure 2

METHOD AND SYSTEM FOR IMPROVED MONITORING, MEASUREMENT AND ANALYSIS OF COMMUNICATION NETWORKS UTILIZING DYNAMICALLY AND REMOTELY CONFIGURABLE PROBES

CROSS-REFERENCE TO RELATED APPLICATIONS

This application is a continuation of U.S. patent application Ser. No. 10/047,240 issued Jan. 14, 2002 as U.S. Pat. No. 7,043,237, from which priority is claimed under 35 U.S.C. 120 and which is incorporated herein by reference.

TECHNICAL FIELD

This invention relates generally to the field of communication networks, and more specifically to a system and method for monitoring and improving communication networks, including telecommunication and wireless networks.

BACKGROUND OF THE INVENTION

The advent and rapid expansion of communication networks in which mobile communication devices are installed, such as wireless cellular telephone networks, have placed ever-increasing demands on the network operator to maintain and improve network quality. To this end, service providers and other network operators have typically deployed a dedicated Mobile Test Unit (MTU) measurement tool in the network as needed to perform field measurements in response to consumer complaints and other indicators of poor network quality. The MTU is a dedicated hardware test solution deployed on a limited basis to collect measurement data and the number of units deployed is very small in relation to the subscriber population, yielding a statistically small measurement base.

The problems associated with the collection of network field measurements in this way are many. Since the MTU or equivalent is a statistically small sampling of the actual population of users at any given time, the collected data may be statistically suspect on a day-to-day operational basis. The collection of measurement data does not necessarily reflect the occurrence of problems as experienced by an actual user of the network since the deployment of the test units are so sparse relative to the device population. In other words, the MTU may not actual "see" the problem as it is seen by an actual user on the network. Moreover, the deployment of MTUs in an indoor environment is performed in a very limited, diagnostic way, thereby yielding statistically insignificant sampling in that environment. Statistical switch information has been used to try to provide broader statistical sampling that more closely approximates the number of subscriber units. However, the amount of detail provided is often compromised when the network is experiencing significant network problems. Also, collection of data at the switch does not necessarily reflect the actual experience of individual network users.

There is therefore an unmet need in the art to be able to quickly, accurately, and dynamically respond to perceived quality problems occurring within communication networks, in both indoor and outdoor environments, with broad statistical sampling in order to be able to enhance quality of network services perceived by individual network users.

SUMMARY OF THE INVENTION

Therefore, in accordance with the present invention, one or more communication devices within a communication network are provided with a dynamically and remotely configurable probe element, implemented at least partially in software and controllable by the network operator via one or more communication links, capable of monitoring, measuring and capturing user interaction data flowing from voice and/or data transactions occurring in the network. User interaction data reflects a user's actual experience on the network and thus provides valuable raw data usable by the network operator for improving network quality from the user's perspective, especially when received from a statistically significant number of network user devices. Collected user interaction data can include network engineering metric data and/or user profile data.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The present invention describes software capable of monitoring, capturing and measuring actual network experience from the perspective of a communication device in a communication network, such as from the perspective of a wireless handset in a wireless communication network, in order to provide actual, empirical information like Quality of Service (QoS) from the perspective of a user of the communication device. This actual network data provides valuable information that can be used by an operator of a network to improve the quality of the network, particularly with regard to the quality of service as perceived from the perspective of a user of a particular communication device. For instance, a wireless service provider (WSP), such as a cellular phone service provider or other network operator of a communication network, can use the captured data from various communication devices on its wireless network to analyze, identify and subsequently improve problem areas in delivery of services, thereby improving the quality of the network as perceived by users of the network. As used herein, the term network operator may, in addition to being a service provider, encompass other definitions of control and/or interest in the workings of the communication network, such as a manufacturer of a communication device and third party companies other than the actual service provider, like those providing consulting services to a service provider.

Figure 1:
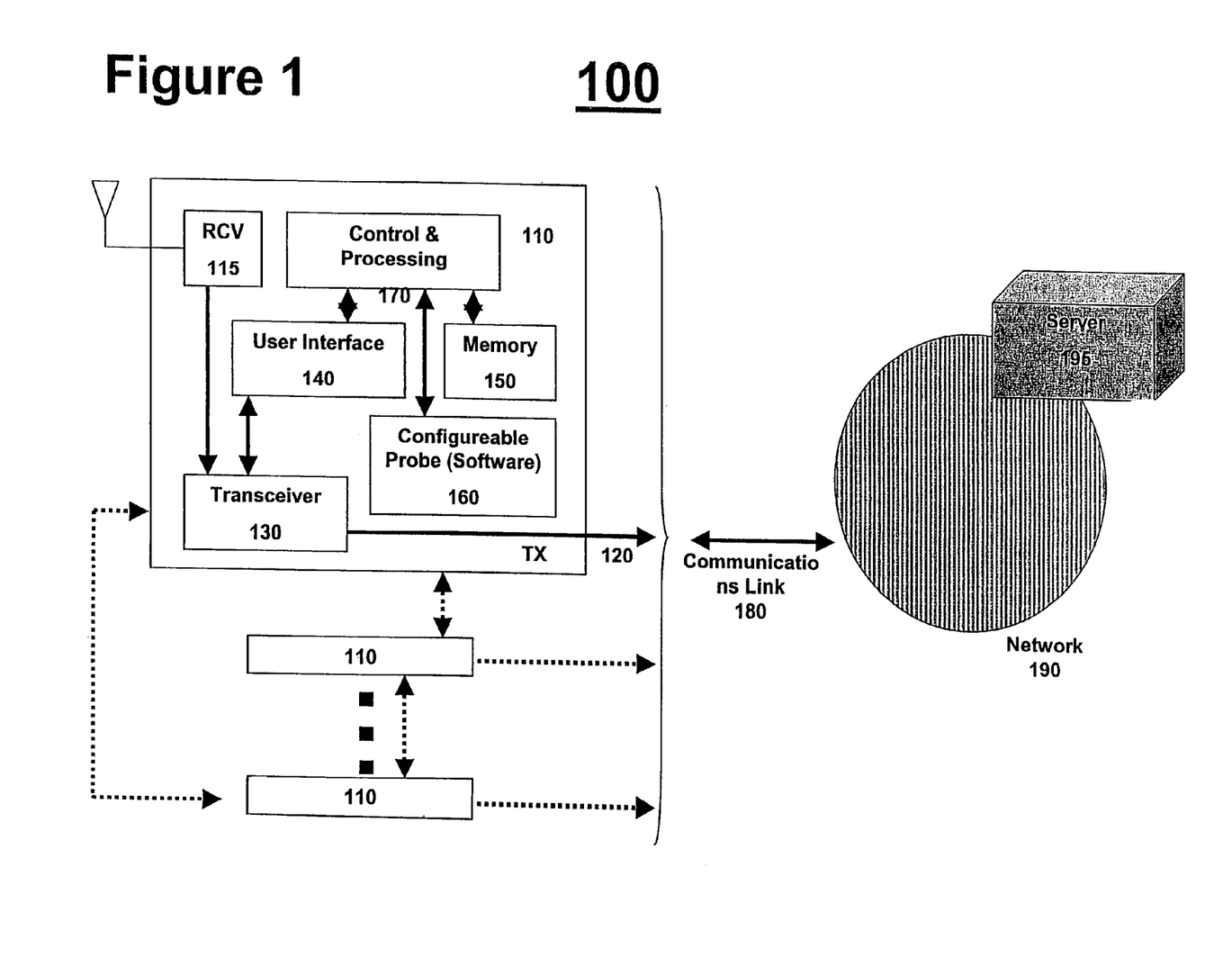
FIG. 1 is a block diagram of a communication network having one or more configurable software probes in communication devices of the network, according to an embodiment of the present invention.

Referring now to FIG. 1, a system block diagram of a system 100 in accordance with the present invention is shown. A number of unattended communication devices 110, capable of having a software probe element and thus functioning as unattended probes, are operable to function in communications network 190. Communication network 190 is capable of providing or facilitating voice communication and/or data transactions, services, or communications. Examples of communication networks in which the present invention may be practiced include, but are not limited to, telecommunication networks, wireless networks, telephone networks, such as cellular mobile telephone networks (CeN), and data communication networks. A communication device 110 may be any device having a user interface capability associated with it, a network connectivity capability, the ability to receive location-based services and, preferably, the ability to accept software applications such as the software probe application of the present invention. Examples of communication devices include, but are not limited to, wireless communication devices such as a handsets or cellular telephones, telematics devices or modules (such GM's OnStar System), personal computers (PCs), consumer appliances such as set-top boxes, and personal digital assistants (PDAs).

As will be described, communication devices 110 having a configurable probe element 160 are able to monitor, measure and capture transactions occurring in the network, as seen from the perspective of a user of the communication device, and then provide this user interaction data via one or more communication links 180 to one or more servers 195 of the network 190. This user interaction data may be either network engineering metric data or user profile data and is important to optimizing the functionality and quality of the network as seen by the user of the communication device. Operation and quality of the network is managed by a network operator. Transaction data and user interaction data measured and collected from the user/network transactions can be temporarily stored in a memory 150 of the communication device prior to being transmitted via the communication link 180 to the network server 195. The one or more communication links to the network may be any means suitable for communicating between the communication device and the rest of the communications network 190 and thus include, by way of example and not limitation, wireless, cable, fiber optics, Internet, virtual private network (VPN) tunneling, etc. For instance, the link may be an Internet link to a public or private network server or it may be a private network medium to a private network, as in the case of a virtual private network (VPN) tunnel to a server residing at a corporate intranet site or it may be an HTTP connection via the Internet to the server 195. The measurement values of the user interface data may be in CSV (comma separated values) format passed in an HTTP POST parameter list, for instance. The user interaction data may or may not be encrypted; encryption may be necessary in environments in which user and data privacy is a concern. Many known encryption techniques and approaches, such as the MD5 hashing algorithm, may be utilized.

The functionality of the server may include the ability to store user interface data transmitted from the communication device to the server via the communication link and the ability to send desired diagnostic criterion to be performed by the software probe of one or more communication devices. The server 195 may be one or more servers having functionality to remotely control software probe 160 and may serve as one or more databases for storing the user interaction data collected from the various communication devices 110. For instance, the user interaction data may be stored in one or more database tables via SQL on an Oracle 8i database.

The communication device will preferably have a transceiver element 130 having both receiver and transmitter functionality for facilitating communications between the communication device and the communication network 190; a controller and processing capability, such as embedded JAVA processing, which, together, can be referred to as a control and processing element 170; a user interface element 140, such as a keypad and display screen to allow the user to both send and receive communications and transactions in the network via the communication device; a dynamically and remotely configurable probe element 160 representative of the software probe described above; and a memory element 150, such as a buffer, for storing, at least temporarily, transaction data that is monitored, measured and captured by the communication device prior to it being transmitted to a server 195 of network 190. The user interface element will have the ability to monitor key presses made by the user, recognize voice activity of the user, and the ability to create a data file of the actual user experience on the communication device. The available memory resident in network communication devices is growing rapidly and thus supports the temporary storage of user interaction data prior to transmission of said data to a server of the network; handsets, for instance, are expected to achieve 32–256 MBytes of memory.

Communications engaged in by a user of the communication device may be manifested as voice and/or data transactions between the user and the communication network via the user interface 140. The probe element 160 is a dynamically and remotely configurable software element that is able to monitor, measure and capture at least some portion of the characteristics of the transactions the user engages in, from the perspective of the user, as user interface data. The functionality of the software probe 160 is performed in accordance with a functional definition of the probe element that is able to be dynamically and remotely configured, added to, changed, deleted, upgraded, etc. at will via the one or more communication links 180 by the network operator or other party interested in controlling probe operation of the communication device. User interaction data collected by the configurable software probe may be temporarily stored in memory 150. Control and processing element 170 provides the control of the other elements and the processing capability required by software 160.

The communication devices 110 communicate within the network 190 via one or more communication links 180. While each communication device having the software probe capability may communicate its user interaction data to a server 195 on the network directly, it is also possible to perform some measure of aggregation of user interaction data on the communication device side of the network. To this end, communications capability between communication devices in the network would allow a group of communication devices within a certain geographical area, for instance, to transmit or route their user interaction data to a collection communication device within the group that would aggregate this user interaction data from the multiple communication devices of the group prior to transmitting it across a communication link to the network server. This would reduce the number of direct communications occurring across the communication link to the network server. Thus, each communication device 110 having the software probe capability is also capable of communicating its collected user interaction data to a server 195 of the network 190 via a collection communication device which collects user interaction data from one or more other communication devices, such as within a certain geographical area, and sends the aggregated user interaction data to the server 195. The use of a collection communication device frees up other communication devices from the responsibility of sending their user interaction data directly. The dashed communication links shown between the communication devices 110 illustrate the option of intra-communication device communication. The advances associated with the data transmission rates in network communication devices facilitates the transmission of large amounts of meaningful data from the communication devices to the network server. The data transmission rates associated with so-called second generation (2G) applications are rather inefficient, with a typical maximum rate being perhaps 9.6 or 14.4 kBits per Second. The data rates associated with 3G applications are expected to increase by roughly an order of magnitude or more, such as to 80 to 144 kBits per Second, and to change from circuit-switched to packet-data, for instance.

In addition to the concept of groups being used to aggregate user interaction data prior to sending the data to the network, the concept of grouped communication devices can be used to facilitate broadcasting information and/or instructions from the server to the communication devices. The network operator may decide to broadcast a new or changed functional definition to each communication device in a group of communication devices, rather than to each individual communication device of the group. The group could be a subset of communication devices in the network or it may be considered to be all of the devices, in which case the broadcast would be considered a global change. The new functional definition can have several different effects on operation of the communication devices within the group. The changed functional definition may simply change the programming of the communication devices without changing their mode of operation (either has a monitor type communication device or a diagnostic type communication device as will be described below), change the diagnostic criterion of communication devices operating in the diagnostic mode, or change the mode of operation, such as from changing the functionality of the communication device from a monitoring type to a diagnostic type device, or vice versa. The functional definition may be broadcast to a collection communication device of the group which will then have the responsibility for distributing the new definition to other devices within the group.

Each communication device 110 can be any type of communication device, including wireless devices and telematic modules or devices capable of operating in a communication network environment, receiving location-based information such as might be provided by GPS technology, and preferably capable of supporting third party (3P) applications that can be loaded onto the communication device. The dynamically and remotely configurable probe software of the present invention is an example of such a 3P application. Location-based information may be provided internally to the communication device such as internally-generated GPS or it may be a network-provided service available upon demand.

The probe element 160 is preferably software capable of being easily and remotely configured and controlled (added, modified, changed) by a network operator of the communication network 190 via the communication link 180. The probe software may be considered a third party (3P) application capable of residing and operating within the communication device. The software of the probe element may be implemented in any desired format, but will preferably be implemented in an open-development environment that facilitates the development of portable 3P applications. Examples of acceptable application and/or programming platforms and environments suitable for implementation of the probe element include, but are not limited to, the following: Sun JAVA (J2ME), C, C++, Qualcomm Binary Runtime Environment for Wireless (BREW) application environment, Microsoft Stinger, Symbian operating system, or proprietary third party operating system, environment, and/or programming language. The probe software, which can include diagnostic criterion for performing network diagnostics, can be downloaded from the network operator to the communication device via the communication link, such as over the Internet. The probe software will preferably have an identification element, such as a control or serial number, which can be used to associate a particular copy of the software with a particular network subscriber or communication device.

Collection of user interaction data can be used to profile subscribers (users of the communication devices) on the network and to isolate network engineering problems. Network engineering data or metrics are useful to characterize network performance while user profile data are useful to categorize the behavior and/or preferences of subscriber users on the network. User interaction data as network engineering data or data services measurements can include, but is not limited to the following: the location of attempted calls, no service calls, blocked calls, network messages, dropped calls, good calls, data delay, data errors, power measurements, interference measurements, quality measurements (such as signal strength, bit error rate, and frame erasure rate, etc.), attempted handoffs, successful handoffs, failed handoffs, the presence of neighbors on the network, the time it takes for a call to be connected, characterization of a call as incoming or outgoing, data throughput and location measurements (including latitude, longitude, elevation, time, speed of vehicle in which device is located). User interaction data as user profile data can include, but is not limited to, the following types of data: time of call, call duration, number of calls placed, number of times a particular number is called, called numbers, and the number of times a previously blocked call is reattempted.

The method and timing of collection of user interaction data for a particular communication device is controlled by the functional definition of the software of the probe element, which can be dynamically changed as desired, and is reflected in the mode of operation of the communication device, as will be discussed. Collection of data may be triggered by the occurrence of an event, such as the user turning on the handset or a dropped call, and either pre- or post-event collection is selectable for a predetermined period of time bracketing an event, such as 30 seconds within the occurrence of an event. There may additionally be conditional collection of data such as circular and rectangular areas of collection within the network and interval collection dependent on various interval measurements such as time of day intervals and distance intervals. The collection of the user interaction data by the network can be supplied to various functions in the network, such as customer care, operations, engineering, maintenance, etc. for use in improvement network performance.

Consider the following example in which the monitoring and collection of user interaction data is illustrated. The specific measurements explored in this example of data and voice calls are by way of example only and are not meant to be limiting of the present invention. Position data (longitude, latitude, etc.) is collected at the point of original of call origin and an answered call by the software of the probe monitoring the SEND key or Voice Activity Detection (VAD) feature of the user interface of a subscriber wireless device. If no voice activity is detected for a default period, such as 20 Seconds or more, then the call is classified as a Blocked call. If voice activity is present but lasts only 15 Seconds before ending without an END key press, then the call is tagged as a Network Error Message. If the call has voice activity that last longer than 15 seconds and then ends without an END key press, then the call is classified as a Dropped call. Any calls that have voice activity, last longer than 15 seconds, and then end with an END key press, can be classified as a Good call. Any placed call that is placed while the phone is in a No Service State will be recorded as a No Service call.

In addition to these call statistics, data statistics may be collected by additionally monitoring the microbrowser of the cellular phone, for instance, for that during user initiated data calls, the call throughput and delay for each data transaction as well as the overall time of the data call itself may be determined. Anytime that the measured throughput or delay is beyond an acceptable definable threshold, such as 15 seconds, then the call is classified as a Slow Data Response call. If a call was not successfully established, it could be designated a Failed Connection call. If an established data call is lost, then it could be classified as a Disconnected Data call. Data calls not having the above problems, may be classified as Good Data calls. The above provides an example of a time-based classification of transactions.

The above call-processing and data service usage experiences of the user of the communication device constitute examples of user interaction data that can be temporary stored in a data file on the handset until such time as a file transfer to transfer the data to the network server can be performed. Exactly when the data will be uploaded is definable. An example of transmission would be include at the end of a subscriber's data call, the software remaining linked to the network for an additional 10 seconds and then transferring the file to the server in a manner transparent to the device user. Another example would be to send the data as a data call to the network right at power down of the device. This could be accomplished by blanking the phone screen while still being powered on for an additional period of time, such as 30 seconds or less, to perform the file transfer at a predetermined time.

Multiple communication devices, all with the capability to monitor and capture interaction of the communication devices with the communication network. Placement of the monitoring and capturing capability at the communication device greatly improves the quality of information and thus the performance statistics that can be gathered on network performance. Actual coverage of both the geographic area covered by the network and the device base may be obtained simultaneously through the monitoring and collection of individual device experiences in the network. Reliance on the previous practice of individual drive tests, in which estimations concerning network performance are extrapolated from a statistically insignificant number of tests and which provide much less reliable statistical information, may be greatly reduced. And, since the information gathered is from the perspective of multiple communication devices, there is a real, previously unavailable opportunity to improve the network user's experience.

Placement of the monitoring and capture software probe inside a statistically significant number of the actual communication devices in the network is economically viable, especially when such probes are implemented in software as is the case in the preferred embodiment. The user interaction data transmitted from multiple communication devices in the network to the server may be aggregated to provide statistically significant information about either users on the network or about geocentric network performance problems occurring within the network. The greater the number of communication devices in the network having the software probe, the better the statistical information, in terms of geographic and temporal coverage, that can be gleaned about the network.

A communication device 110 having the configurable probe element 160 may operate in a variety of probe modes. Modes of operation of a communication device include, but are not limited to, a non-interactive mode of operation, a quasi-interactive mode of operation, and a diagnostic mode of operation. In the normal, non-interactive mode of operation, the communication device monitors and captures transactions between the user and the communication network, whether they be voice and/or data service transactions, such as a voice call or downloading E-mail, and measures characteristics of the transactions to generate the user interaction data in a manner that is transparent to the user of the communication device. The advantage to the user of this mode is that transactions between the user and the network may be monitored, captured and measured without affecting service in the network to the user. Control of the transmission of the user interaction data resides within the software probe configuration which can be changed or updated as desired and may be a function of the size of the temporary memory 150 resident in the communication device. For example, the captured data may be updated via the communication link to the network server after every N calls and the memory or buffer of the communication device cleared out to make room for more data. The frequency of uploading data to the network may be increased if the available memory is otherwise insufficient.

In a quasi-interactive mode of operation, the communication device still monitors and captures user/network transactions experienced by the user and measures one or more characteristics of such transactions to generate the user interaction data, but the user is additionally given the option of deciding when to report to the network operator one or more network performance problems identified in the user interaction data. The probe software may present the user with an option, in "real-time" at the time of occurrence of a network performance problem or event, of when to report the problem, such as immediately, or the user may be provided with this option at predetermined intervals, such as at X seconds following the occurrence of the network problem. Alternately, the user may have previously selected that the communication device would operate in this mode of operation.

Consider the following example of operation of the communication device in the quasi-interactive mode of operation. Upon the occurrence of the network event of a cellular telephone user's call being dropped, the software probe resident on the device, which has monitored and thus captured the event, communicates with the user via a GUI, for instance, to ask if the user would like to "opt-in" to report the problem to customer care of the network service provider. If yes is selected, then the user is next given the option of when to report the network problem: Now, Later, or Automatically. If the user selects the Now option, the software probe causes the phone to transmit the data associated with this problem to the network server immediately. If the user selects to report the problem the Automatic option, then the probe software arranges to report the problem at a predetermined time (such as every 30 minutes) or upon occurrence of a predetermined event (such as upon the user powering-down the phone) without further input from the user. If the user selects to report the problem Later, then this will cause the data associated with the problem to be transmitted by the phone to the network server at some future, predetermined time. Optionally, the software probe may cause another option to be presented to the user if the same network problem or event occurs a predetermined number of times, such as more than three, to never report the problem to the network. Selection of the Never option by the user may have the effect of de-installing the probe software from the user's communication device. This example makes it clear that it takes less effort on the part of the user to report network problems or events to the network operator. More accurate information can only help to improve the quality of services that is provided to network clients.

In the diagnostic mode of operation, the network operator, such as the service provider, is permitted to dynamically control the communication device in accordance with a diagnostic criterion, which may be one or more diagnostic tests that the communication device is to perform in order to diagnose one or more network performance problems that have been identified in the network. This mode provides a dynamic analysis and troubleshooting capability to the network operator without the need to send drive units into the network and thus the quality of service as perceived by the user can be more readily and quickly improved at a much lower overall cost. In the diagnostic mode of operation, classification of transactions occurring may be message-sequence based as well as a time-based approach. For instance, further call classification may be based upon message-based algorithms in which greater resolution of classification types may be achieved to further improve the diagnostic capabilities.

The diagnostic criterion may be downloaded as needed from the network operator to the probe software via the communication link existing between the network and the communication device. The diagnostic criterion may be changed, updated, deleted, or added in real-time by the network operator as needed via the communication link. For instance, a version of the software probe in the communication device may have a "time bomb" feature in which the software is automatically de-installed after a certain period of time or upon the occurrence of a particular event. This feature may prompt the software to request an updated version of the software from the network operator via the communication link.

Entry into the diagnostic mode may be achieved a number of ways. Entry may be controlled by the network operator in response to the need at the network level to perform diagnostics in a geographical or temporal area in which the communication device happens to be located. For instance, the network operator may send updated diagnostic programming designed to test certain network problems to a communication device in response to that device entering the geographical area having those network problems. In instances in which the network operator, such as a customer care or engineering function of a network service provider, assumes operational control of the communication device, the user of the communication device may have previously given permission for the network to dynamically assume control of its communication device in certain situations, such as in return for a lower monthly subscriber rate or as part of a subscriber contract. Assumed control of the communication device by the network operator, however, is accomplished in a manner that preferably minimizes disruption in service to the subscriber user. The user will be allowed to resume control of the communication device at any time an emergency number, such as 9-1-1, is dialed, for instance. In addition to the diagnosis mode of operation be effected by the network operator, entry in real-time may also be accomplished at the request or instigation of the user of the device. Consider the user requesting that the network perform a diagnosis of or validate the user's handset.

When the communication device is not in the diagnostic mode, the communication device may otherwise operate in the non-interactive mode in a manner that is transparent to the user as outlined above. Alternately, the communication device may operate in a quasi-interactive mode, outlined above, in which the user is given the opportunity to decide when to report one or more network performance problems that have been identified.

Figure 2:
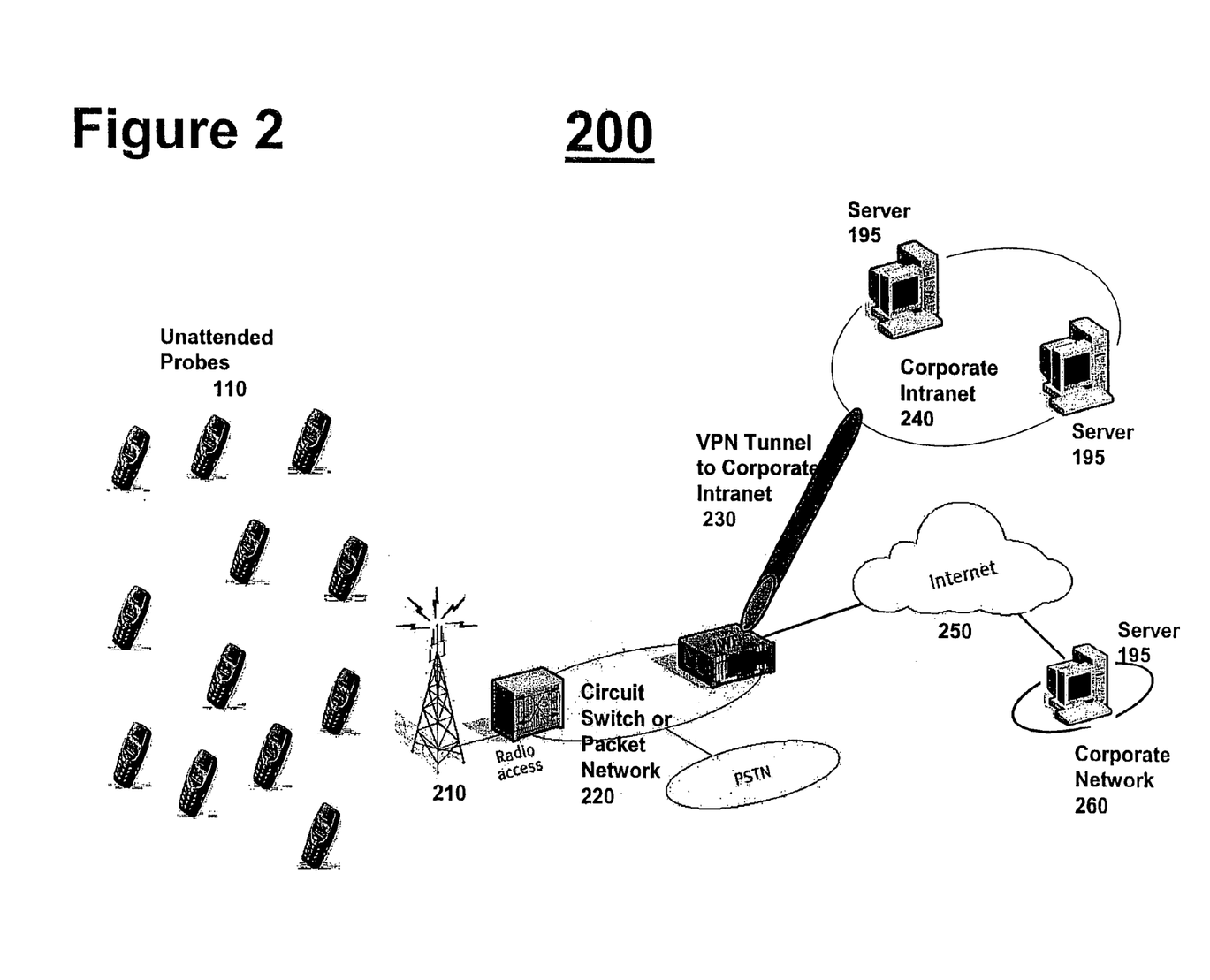
FIG. 2 is a block diagram of an exemplary wireless communication network, according to an embodiment of the present invention.

Referring now to FIG. 2, a system block diagram 200 of an exemplary wireless communication network environment in accordance with a preferred embodiment of the present invention is shown. A number of unattended communication device probes 110 are illustrated. While these communication devices are illustrated as cellular telephones, it is understood that any desired communication device may be used, as described above. Each of the communication devices 110 may have resident probe software making it capable of monitoring and capturing and making measurements of transactions occurring between a user of the communication device and the communication network to generate user interaction data associated with the particular communication device 110. The communication device 110 can then transmit its data to one or more servers 195 of the communication network via one or more communication links 210, 220, 230, 250, etc. In this cellular telephone network example, the communication devices 110 transmit user interaction data using UDP or SMS packets to a base station 210 and circuit switch or packet network 220 which in turn can transmit the user interaction data to the one or more servers 195 in a variety of ways, such as via a VPN tunnel communication link 230 to a private intranet environment 240 or via a communication link like the Internet 250 to another network, such as a corporate network. As previously described, each of the communication devices 110 may send their own collected user interaction data to servers of the network directly or they may be in communication with another communication device of the network that serves as a collection communication device. The collection communication device is responsible for collecting and then aggregating user interaction data from multiple communication devices prior to sending the aggregate user interaction data to one or more servers of the communication network via the appropriate communication link(s). The user interaction data provided to the one or more servers 195 of the network, whether aggregated or not, provide the important raw data needed to analyze network conditions and identify potential problem areas on the network.

Figure 3:
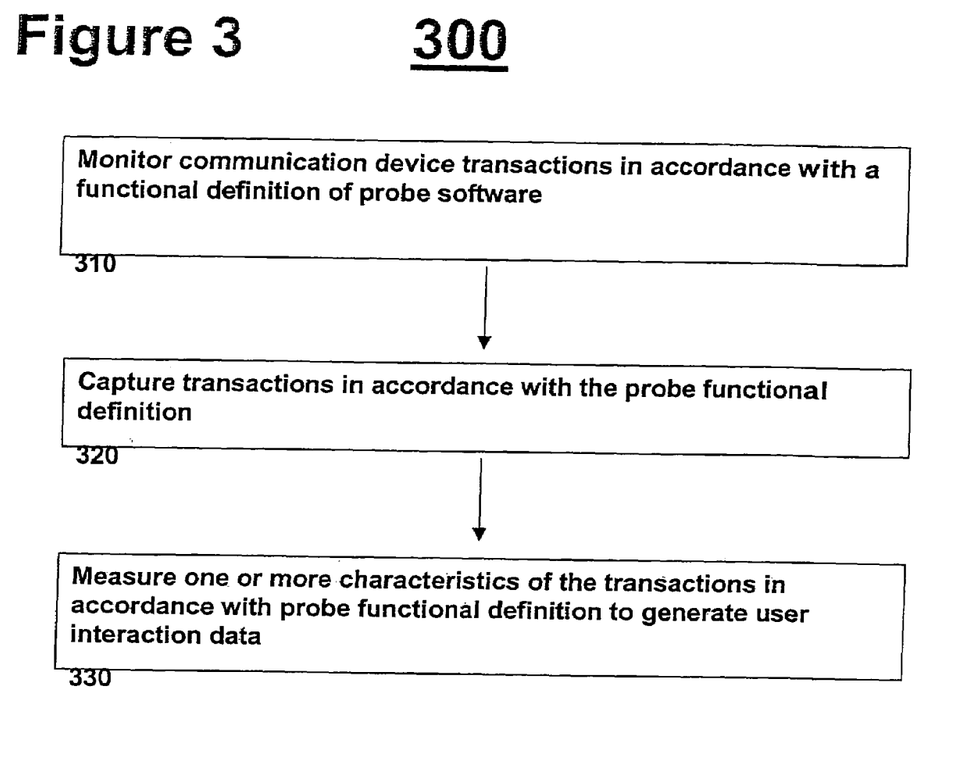
FIG. 3 is a flow chart in accordance with an embodiment of the methodology of the present invention.
Figure 4:
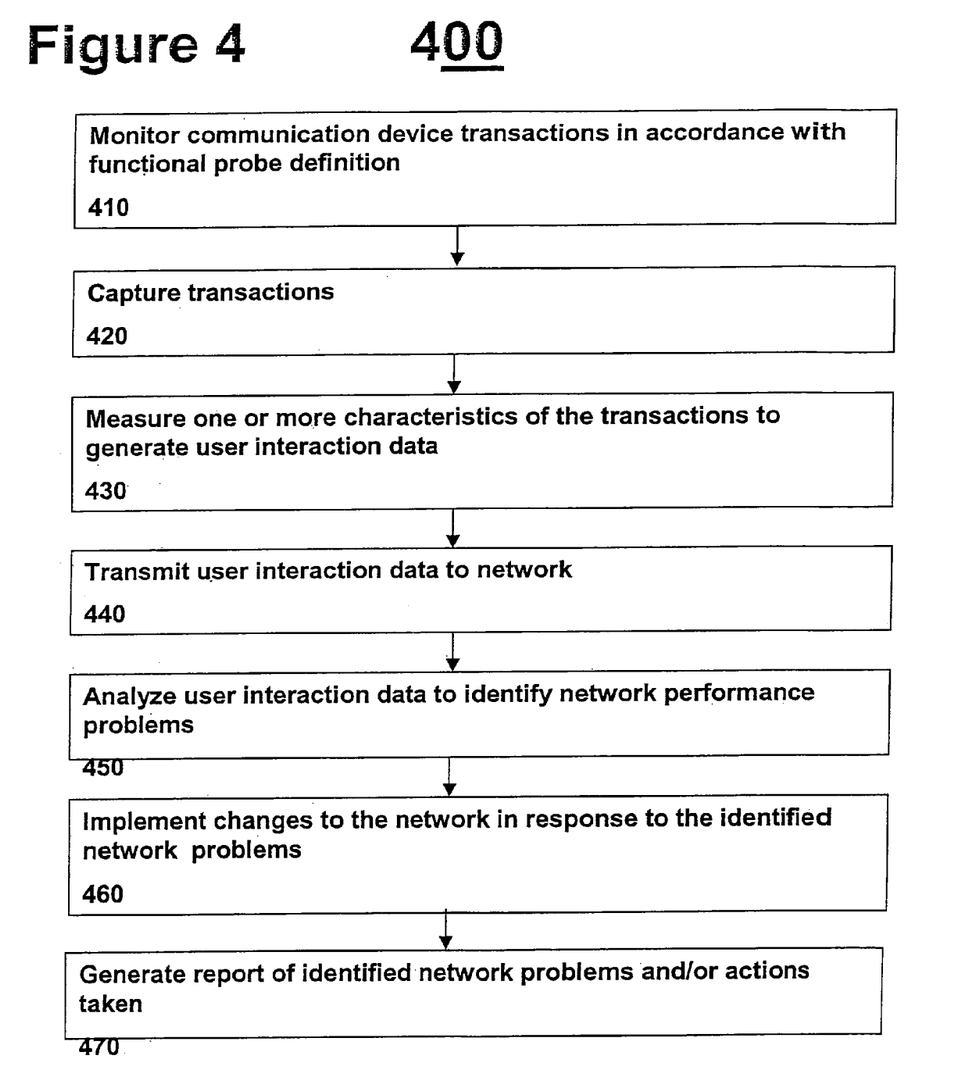
FIG. 4 is a flow chart in accordance with a further embodiment of the methodology of the present invention.

FIGS. 3–4 illustrate one or more aspects of the methodology associated with the software probe of the present invention. These aspects have been discussed in more detail previously.

Referring now to FIG. 3, flowchart 300 illustrates the methodology of the present invention from the perspective of the software probe on a communication device. At Block 310, the software causes transactions between the communication device and the network to be monitored according to the functional definition of the probe software. The functional definition can be down-loaded from the network operator of the network as needed in real-time, may be changed as required, or it may currently reside on the device. At Blocks 320 and 330, the characteristics of the monitored transactions are captured and measured. User interaction data is generated from the monitored and measured transactions. It is important to note that Blocks 310–330 should not necessarily be interpreted as occurring sequentially in time. For instance, it is envisioned that measurements and data associated with the transactions will be captured as they are monitored, in real-time. Again, how this is accomplished is dependent upon the software probe. Measurement taking at Block 330 may occur in response to some triggering event or condition, such as the occurrence of a blocked or dropped call or upon the user initiating a call or redial.

In FIG. 4, the interaction between a communication device and the rest of the network is described. As in FIG. 3, Blocks 410–430 describe monitoring of transactions to generate the user interaction data. At Block 440, this data is transmitted to the network. As previously described, this transmission may occur directly from the communication device to the network or it may occur via a collection communication device. The user interaction data will be transmitted to a server element of the network where it may be analyzed by a network operator, meaning someone interested in the network engineering metrics and/or user profile information contained within the user interaction data, to identify one or more network engineering problems at Block 450. These problems, once identified, may then be countered, as in Block 460. Reports based upon the identified network problems and/or steps taken to counter them may be generated at Block 470; it is understood that report generation may occur before or after Block 460. Such reports will have value to various functionalities of the network operator, such as engineering, customer service, operations, maintenance, etc.

As discussed, the more data that is collected from communication devices throughout the network the better the statistical basis for identifying and improving network quality from the perspective of the network user. To this end, it is understood that Blocks 410–440 will likely be performed for multiple communication devices of the network. The user interaction data from multiple communication devices can then be aggregated in order that statistically significant information about the network is collected. The identification of network problems and any subsequent countermeasures enacted in response to them can thus be expected to be more efficient and efficacious.

Those of ordinary skill in the art will recognize that the present invention has been described in terms of exemplary embodiments. In particular, it should be noted that a number of spring plungers different from two may be used without departing from the spirit and scope of the present invention. It should also be noted that the gimbal system could employ one or three axes as well.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for monitoring and improving communications of a communication network having a plurality of communication devices by which a plurality of corresponding users communicate in the communications network, said method comprising:

monitoring a plurality of transactions occurring between a user of a communication device operating in a communication network and the communication network in accordance with a functional definition of a probe element of the communication device, wherein the plurality of transactions are at least a portion of the user's interaction with the communication network via the communication device and wherein the functional definition of the probe element is operable to be dynamically and remotely configured by the communication network via a communication link between the communication device and the communication network;

capturing the plurality of transactions in accordance with the functional definition of the probe element;

measuring one or more characteristics of the plurality of transactions to generate user interaction data in accordance with the functional definition of the probe element;

a network operator of the communication network dynamically controlling operation of the communication device in a diagnostic mode of operation in accordance with a diagnostic criterion; and when not in the diagnostic mode of operation the communication device operating in a quasi-interactive mode of operation during which the plurality of transactions are monitored and captured and the one or more characteristics of the plurality of transactions are monitored by the probe element to generate the user interaction data and during which the user can decide when to report to the network operator one or more network performance problems identified in the user interaction data.

2. The method of claim 1, further comprising: the network operator controlling the communication device to perform diagnostic tests of one or more network performance problems capable of being monitored by the communication device in accordance with the diagnostic criterion.

3. The method of claim 1, further comprising: when not in the diagnostic mode of operation the communication device operating in a non-interactive mode of operation during which the plurality of transactions are monitored and captured and the user interaction data is generated in a manner that is transparent to the user of the communication device.

4. The method of claim 1, further comprising: the user of the communication device granting permission to the network operator to control the communication device to perform diagnostic tests while in the diagnostic mode of operation.

5. The method of claim 1, further comprising: downloading the diagnostic criterion from the communication network to the probe element via the communication link.

6. The method of claim 5, wherein the communication link comprises the Internet.

7. A method for monitoring and improving communications of a communication network having a plurality of communication devices by which a plurality of corresponding users communicate in the communications network, said method comprising:

monitoring a plurality of transactions occurring between a user of a communication device operating in a communication network and the communication network in accordance with a functional definition of a probe element of the communication device, wherein the plurality of transactions are at least a portion of the user's interaction with the communication network via the communication device and wherein the functional definition of the probe element is operable to be dynamically and remotely configured by the communication network via a communication link between the communication device and the communication network;

capturing the plurality of transactions in accordance with the functional definition of the probe element;

measuring one or more characteristics of the plurality of transactions to generate user interaction data in accordance with the functional definition of the probe element; and the communication device operating in a quasi-interactive mode of operation during which the plurality of transactions are monitored and captured and the one or more characteristics of the plurality of transactions are measured by the probe element to generate the user interaction data and during which the user can decide when to report to the network operator one or more network performance problems identified in the user interaction data.

8. The method of claim 7, further comprising:

the user of the communication device previously deciding that the communication device will operate in the quasi-interactive mode of operation.

9. A method for improving communications of a communication network having a plurality of communication devices by which a plurality of corresponding user communicate in the communications network, said method comprising:

for each communication device of the plurality of communication devices:

monitoring a plurality of transactions occurring between a user of a communication device operating in a communication network and the communication network in accordance with a functional definition of a probe element of the communication device, wherein the plurality of transactions are at least a portion of the user's interaction with the communication network via the communication device and wherein the functional definition of the probe element is operable to be dynamically and remotely configured by the communication network via a communication link between the communication device and the communication network;

capturing the plurality of transactions in accordance with the functional definition of the probe element;

measuring one or more characteristics of the plurality of transactions to generate user interaction data in accordance with the functional definition of the probe element;

transmitting the user interaction data to the communication network in response to at least one of the functional definition of the probe element and a request from the communication network;

the communication network aggregating the user interaction data received from one or more communication devices of the plurality of communication devices to generate statistical information about the communication network;

the communication network analyzing the statistic information to identify one or more network performance problems of the communication network;

a network operator of the communication network dynamically controlling operation of the one or more communication devices in a diagnostic mode of operation in accordance with a diagnostic criterion; and when not in the diagnostic mode of operation the one or more communication devices operating in a quasi-interactive mode of operation during which the plurality of transactions are monitored and captured and the one or more characteristics of the plurality of transactions are monitored by the probe element to generate the user interaction data and during which users of the one or more communication devices can decide when to report to the network operator one or more network performance problems identified in the user interaction data.

10. The method of claim 9, further comprising:

the network operator controlling the one or more communication devices to perform diagnostic tests of the one or more network performance problems capable of being monitored by the one or more communication devices in accordance with the diagnostic criterion.

11. The method of claim 9, further comprising:

when not in the diagnostic mode of operation the one or more communication devices operating in a non-interactive mode of operation during which the plurality of transactions are monitored and captured and the user interaction data is generated in a manner that is transparent to the users of the one or more communication devices.

12. The method of claim 9, further comprising:

the users of the one or more communication devices granting permission to the network operator to control the communication device to perform diagnostic tests while in the diagnostic mode of operation.

13. The method of claim 9, further comprising:

downloading the diagnostic criterion from the communication network to the probe element via the communication link.

14. The method of claim 13, wherein the communication link comprises the Internet.

15. A method for improving communications of a communication network having a plurality of communication devices by which a plurality of corresponding user communicate in the communications network, said method comprising:

for each communication device of the plurality of communication devices:

monitoring a plurality of transactions occurring between a user of a communication device operating in a communication network and the communication network in accordance with a functional definition of a probe element of the communication device, wherein the plurality of transactions are at least a portion of the user's interaction with the communication network via the communication device and wherein the functional definition of the probe element is operable to be dynamically and remotely configured by the communication network via a communication link between the communication device and the communication network;

capturing the plurality of transactions in accordance with the functional definition of the probe element;

measuring one or more characteristics of the plurality of transactions to generate user interaction data in accordance with the functional definition of the probe element;

transmitting the user interaction data to the communication network in response to at least one of the functional definition of the probe element and a request from the communication network;

the communication network aggregating the user interaction data received from one or more communication devices of the plurality of communication devices to generate statistical information about the communication network;

the communication network analyzing the statistic information to identify one or more network performance problems of the communication network and the one or more communication devices operating in a quasi-interactive mode of operation during which the plurality of transactions are monitored and captured and the one or more characteristics of the plurality of transactions are measured by the probe element to generate the user interaction data and during which users of the one or more communication devices can decide when to report to the network operator one or more network performance problems identified in the user interaction data.

16. The method of claim 15, further comprising: the users of the one or more communication devices previously deciding that the one or more communication devices will operation in the quasi-interactive mode of operation.

17. A method for improving communications of a communication network having a plurality of communication devices by which a plurality of corresponding user communicate in the communications network, said method comprising:

for each communication device of the plurality of communication devices:

monitoring a plurality of transactions occurring between a user of a communication device operating in a communication network and the communication network in accordance with a functional definition of a probe element of the communication device, wherein the plurality of transactions are at least a portion of the user's interaction with the communication network via the communication device and wherein the functional definition of the probe element is operable to be dynamically and remotely configured by the communication network via a communication link between the communication device and the communication network;

capturing the plurality of transactions in accordance with the functional definition of the probe element;

measuring one or more characteristics of the plurality of transactions to generate user interaction data in accordance with the functional definition of the probe element;

transmitting the user interaction data to the communication network in response to at least one of the functional definition of the probe element and a request from the communication network;

the communication network aggregating the user interaction data received from one or more communication devices of the plurality of communication devices to generate statistical information about the communication network;

the communication network analyzing the statistic information to identify one or more network performance problems of the communication network; and a network operator of the communication network broadcasting a group functional definition to a group of communication devices of the plurality of communication devices, wherein said group functional definition overrides the functional definition of each communication device of the group;

wherein the group functional definition comprises a group diagnostic criterion that causes the group of communication devices to operate in a diagnostic mode of operation in accordance with the group diagnostic criterion.

* * * * *